US009381806B2

(12) United States Patent
Tavvala et al.

(10) Patent No.: US 9,381,806 B2
(45) Date of Patent: Jul. 5, 2016

(54) VEHICLE WITH MULTIPLE DRIVE AXLE ASSEMBLY WITH A RAISABLE AND LOWERABLE REAR DRIVE AXLE, AND METHOD OF OPERATING SUCH A VEHICLE

(71) Applicant: Mack Trucks, Inc., Greensboro, NC (US)

(72) Inventors: Krishna Tavvala, Hagerstown, MD (US); Brian Gordon, Shady Grove, PA (US)

(73) Assignee: Mack Trucks, Inc., Greensboro, NC (US)

( * ) Notice: Subject to any disclaimer, the term of this patent is extended or adjusted under 35 U.S.C. 154(b) by 0 days.

(21) Appl. No.: 14/437,878

(22) PCT Filed: Dec. 5, 2012

(86) PCT No.: PCT/US2012/067880
§ 371 (c)(1),
(2) Date: Apr. 23, 2015

(87) PCT Pub. No.: WO2014/088566
PCT Pub. Date: Jun. 12, 2014

(65) Prior Publication Data
US 2015/0266375 A1 Sep. 24, 2015

(51) Int. Cl.
*B60K 17/02* (2006.01)
*B60K 17/16* (2006.01)
(Continued)

(52) U.S. Cl.
CPC ............. *B60K 17/36* (2013.01); *B60K 17/02* (2013.01); *B60K 17/16* (2013.01); *B60K 17/165* (2013.01); *B60K 23/08* (2013.01); *B62D 61/125* (2013.01); *B60K 2023/085* (2013.01)

(58) Field of Classification Search
CPC ...... B60K 17/02; B60K 17/16; B60K 17/165; B60K 17/346; B60K 17/36; B60K 23/08; B60K 2023/085; B62D 61/125
See application file for complete search history.

(56) References Cited

U.S. PATENT DOCUMENTS 4,046,210 A 9/1977 Nelson
4,582,160 A 4/1986 Weismann et al.
(Continued)

FOREIGN PATENT DOCUMENTS

DE 102008015224 A1 3/2009
WO 2008077603 A1 7/2008

OTHER PUBLICATIONS

International Search Report (Feb. 8, 2013) for corresponding International Application PCT/US2012/067880.
(Continued)

*Primary Examiner* — Laura Freedman
(74) *Attorney, Agent, or Firm* — WRB-IP LLP (57) ABSTRACT

A vehicle having a multiple drive axle assembly includes a forward axle assembly including a forward interaxle differential, a forward interaxle differential input shaft and a forward interaxle differential output shaft. An intermediate drive shaft is connected to the forward interaxle differential output shaft. A rear axle assembly includes a rear differential and a rear differential input shaft. A rear clutch arrangement is provided between the intermediate drive shaft and the rear differential input shaft and is movable between a first position in which the rear clutch arrangement rotationally locks the intermediate drive shaft and the rear differential input shaft and a second position in which the intermediate drive shaft and the rear differential input shaft are rotationally disconnected. The rear axle assembly of the vehicle can be raised and lowered relative to a frame of the vehicle.

22 Claims, 5 Drawing Sheets

(51) Int. Cl.
*B60K 17/36* (2006.01)
*B60K 23/08* (2006.01)
*B62D 61/12* (2006.01)

(56) References Cited

U.S. PATENT DOCUMENTS

| | | | |
|---|---|---|---|
| 4,754,847 A | 7/1988 | Glaze et al. | |
| 4,817,753 A | 4/1989 | Hiketa | |
| 4,842,302 A | 6/1989 | Lauronen et al. | |
| 4,977,972 A | 12/1990 | Hicks | |
| 5,083,986 A * | 1/1992 | Teraoka | B60K 17/3462 192/35 |
| 5,398,792 A * | 3/1995 | Teraoka | B60K 17/35 180/248 |
| 5,542,316 A | 8/1996 | Spooner et al. | |
| 5,704,443 A * | 1/1998 | Janiszewski | B60K 17/351 180/247 |
| 6,634,446 B2 * | 10/2003 | Ima | B62D 61/10 180/24 |
| 6,790,152 B2 * | 9/2004 | Mori | B60K 23/0808 192/16 |
| 6,790,154 B1 | 9/2004 | Kelley, Jr. | |
| 6,877,573 B2 * | 4/2005 | Hasegawa | F16D 55/40 180/24.01 |
| 7,779,952 B2 | 8/2010 | Andersson et al. | |
| 7,918,465 B2 | 4/2011 | Metzger | |
| 8,042,642 B2 * | 10/2011 | Marsh | B60K 17/348 180/247 |
| 8,398,520 B1 | 3/2013 | Bassi et al. | |
| 8,608,611 B2 * | 12/2013 | Ekonen | B60K 17/35 475/221 |
| 8,721,493 B2 * | 5/2014 | Burgbacher | B60K 17/35 475/223 |
| 8,851,212 B2 * | 10/2014 | Kahl | F16H 48/06 180/24.11 |
| 9,102,232 B2 * | 8/2015 | Ziech | B60K 17/16 |
| 2005/0009660 A1 | 1/2005 | Nishiji | |
| 2006/0172852 A1 | 8/2006 | Claussen et al. | |
| 2009/0082934 A1 | 3/2009 | Mizon et al. | |
| 2010/0248888 A1 * | 9/2010 | Hamperl | B60K 17/36 475/221 |
| 2012/0234120 A1 * | 9/2012 | Fukuda | B60K 17/344 74/405 |
| 2013/0085031 A1 | 4/2013 | Bassi et al. | |

OTHER PUBLICATIONS

International Preliminary Report on Patentability (Jan. 28, 2015) for corresponding International Application PCT/US2012/067880.

* cited by examiner

VEHICLE WITH MULTIPLE DRIVE AXLE ASSEMBLY WITH A RAISABLE AND LOWERABLE REAR DRIVE AXLE, AND METHOD OF OPERATING SUCH A VEHICLE

BACKGROUND AND SUMMARY

The present invention relates, according to an aspect thereof, to vehicles having multiple drive axles and, more particularly, to such vehicles having one or more raisable and lowerable rear drive axles.

Multiple drive axle trucks and tractors are often referred to as 6×4, 6×6, 8×6, 8×8, 10×8, and 10×10 configurations. A 6×4 configuration, for example, has three axles, with two of the axles being driven axles. Most current commercial trucks and tractors having multiple drive axles are designed to carry substantial loads. While they may carry heavy loads at or close to their maximum loading from point A to point B, they often carry substantially less than their maximum load after unloading at point B.

Trucks and tractors are often designed with, for example, 6×4 configurations instead of 4×2 configurations due to restrictions on axle drivehead load carrying capacities, as well as better maneuverability of 6×4's in adverse weather conditions. A 6×4 configuration will permit input torque from the transmission of the vehicle to be split between the two axle driveheads, thus tending to decrease wear and tear on the drivehead's gears when the truck/tractor carries heavier loads. However, when carrying lighter loads that could be handled by a 4×2 configuration, each of the axle driveheads sees less transmission input torque than what they are designed to handle. Nonetheless, each of the driveheads requires energy to drive the drivehead, the driveheads are both subject to wear and tear due to use, and damage such as false Brinell damage or fretting can occur to structures such as universal joint bearings due to prop-shaft vibration and light loads.

It is desirable to provide a multiple drive axle vehicle that can be converted from one configuration, such as a 6×4, to another configuration, such as a 4×2, depending upon load on the vehicle or the engine.

According to an aspect of the present invention, a vehicle having a multiple drive axle assembly comprises a forward axle assembly comprising a forward interaxle differential, a forward interaxle differential input shaft, a first forward interaxle differential output shaft, and a second forward interaxle differential output shaft, the forward interaxle differential distributing power from the forward interaxle differential input shaft between the first and the second forward interaxle differential output shafts, an intermediate drive shaft connected to the second forward interaxle differential output shaft, a rear axle assembly comprising a rear differential and a rear differential input shaft, and a rear clutch arrangement between the intermediate drive shaft and the rear differential input shaft, the rear clutch arrangement being movable between a first position in which the rear clutch arrangement rotationally locks the intermediate drive shaft and the rear differential input shaft and a second position in which the intermediate drive shaft and the rear differential input shaft are rotationally disconnected.

According to another aspect of the present invention, a vehicle having a multiple drive axle assembly comprises a forward axle assembly comprising a forward interaxle differential, a forward interaxle differential input shaft and a forward interaxle differential output shaft, an intermediate drive shaft connected to the forward interaxle differential output shaft, a rear axle assembly comprising a rear differential and a rear differential input shaft, and a rear clutch arrangement between the intermediate drive shaft and the rear differential input shaft, the rear clutch arrangement being movable between a first position in which the rear clutch arrangement rotationally locks the intermediate drive shaft and the rear differential input shaft and a second position in which the intermediate drive shaft and the rear differential input shaft are rotationally disconnected.

According to yet another aspect of the present invention, a method of operating a vehicle having a multiple drive axle assembly comprises dividing power from a forward interaxle differential input shaft between a first forward interaxle differential output shaft associated with a forward axle assembly and a second forward interaxle differential output shaft associated with a rear axle assembly via a forward interaxle differential, transmitting power to a rear differential input shaft of a rear differential of the rear axle assembly via an intermediate drive shaft connected to the second forward interaxle differential output shaft, and rotationally disconnecting the intermediate drive shaft and the rear differential input shaft.

BRIEF DESCRIPTION OF THE DRAWINGS

The features and advantages of the present invention are well understood by reading the following detailed description in conjunction with the drawings in which like numerals indicate similar elements and in which:

FIGS. 2A and 28 are schematic views show a portion of a multiple drive axle assembly according to an aspect of the present invention in which a rear drive axle is at a normal operating level and in which the rear drive axle is raised above the normal operating level, respectively;

DETAILED DESCRIPTION

Figure 1:
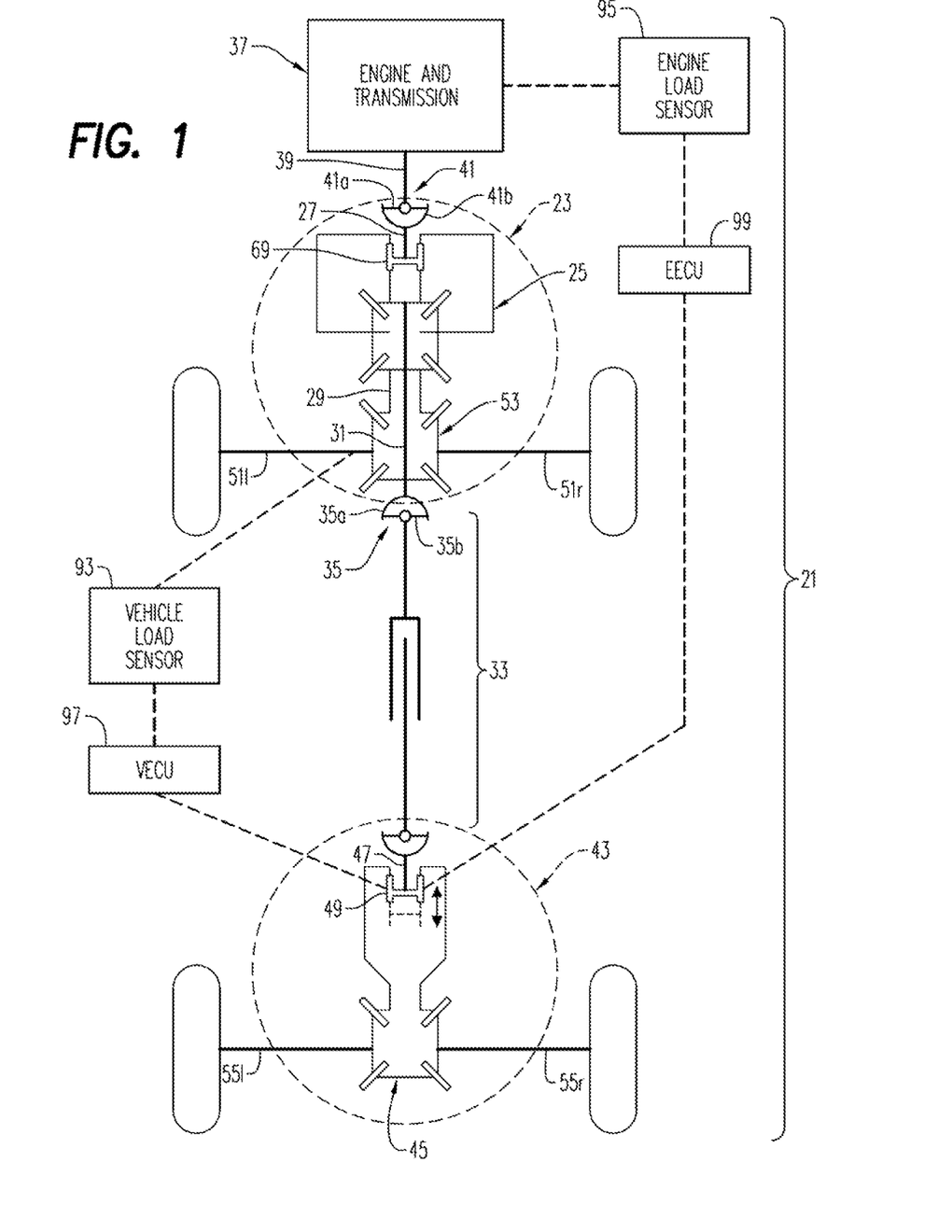
FIG. 1 schematically shows a vehicle with a multiple drive axle assembly according to aspect of the present invention.

FIG. 1 shows a vehicle 21 having a multiple drive axle assembly according to an aspect of the present invention. The illustrated vehicle is a so-called 6×4 configuration, i.e., six wheels, four of which are driven wheels, however, the present invention is also applicable to other configurations, such as 6×6, 8×6, 8×8, 10×8, and 10×10 configurations. The vehicle may be a truck or a tractor.

The vehicle 21 includes a forward axle assembly 23 comprising a forward interaxle differential 25, a forward interaxle differential input shaft 27, a first forward interaxle differential output shaft 29, and a second forward interaxle differential output shaft 31. The forward interaxle differential distributes power from the forward interaxle differential input shaft 27 between the first and the second forward interaxle differential output shafts 29 and 31.

The vehicle 21 further includes an intermediate drive shaft 33 that is ordinarily connected to the second forward interaxle differential output shaft 31 via yokes 35a and 35b of a universal joint 35. An engine 37 or motor of the vehicle drives a drive shaft 39 that is ordinarily connected to the forward interaxle differential input shaft 27 via yokes 41a and 41b of a universal joint 41.

Figure 2A:
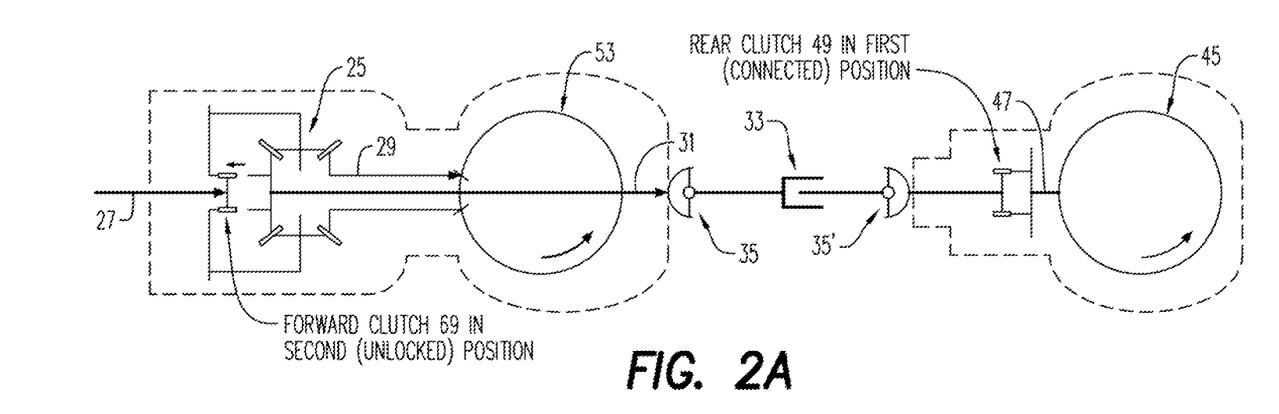
Figure 2B:
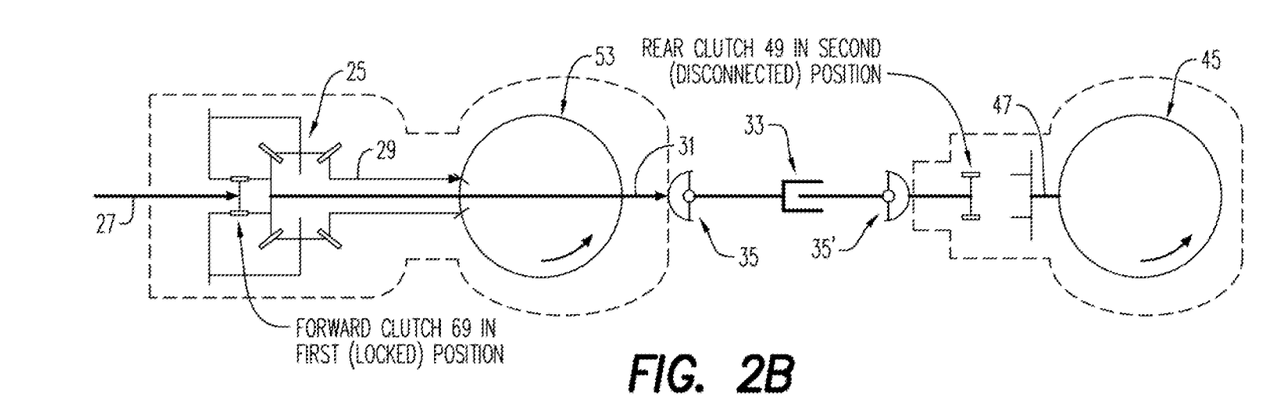

The vehicle 21 further includes a rear axle assembly 43 comprising a rear differential 45 and a rear differential input shaft 47. A rear clutch arrangement 49 is provided between the intermediate drive shaft 33 and the rear differential input shaft 47. The rear clutch arrangement 49 is movable between a first position (FIG. 2A) in which the rear clutch arrangement rotationally locks the intermediate drive shaft 33 and the rear differential input shaft 47 so that the intermediate drive shaft the rear differential input shaft rotate together, and a second position (FIG. 2B) in which the intermediate drive shaft and the rear differential input shaft are rotationally disconnected.

As seen in FIG. 1, power transmitted to the first forward interaxle differential output shaft 29 is distributed to left and right forward drive axles 51l and 51r by a forward differential 53. Power transmitted to the rear differential input shaft 47 via the intermediate drive shaft 33 and the second forward interaxle differential output shaft 31 is distributed to left and right rear drive axles 55l and 55r by the rear differential 45.

Figure 3:
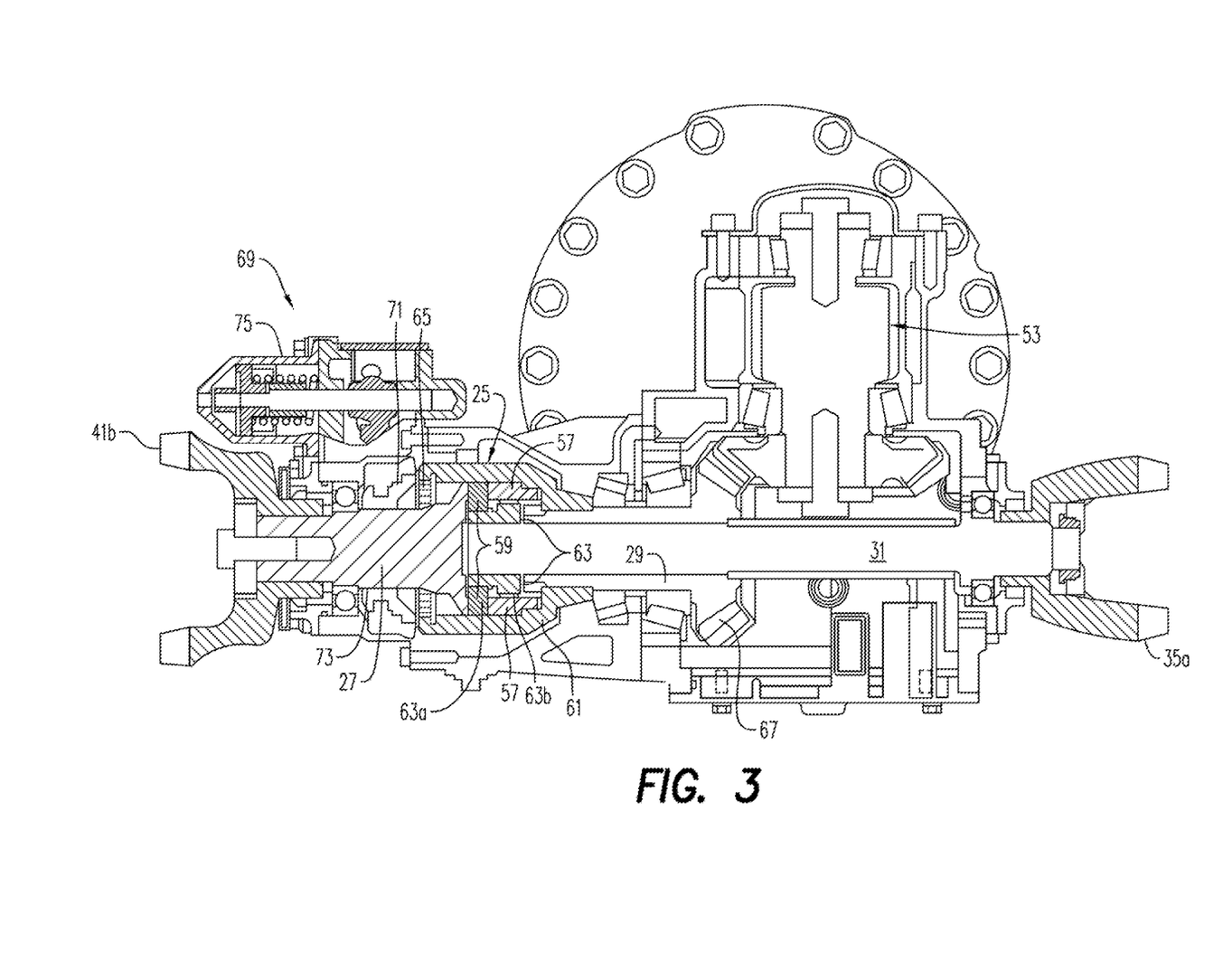
FIG. 3 is a partially cross-sectional side view showing an interaxle differential for a vehicle with a multiple drive axle assembly according to an aspect of the present invention.

While the present invention has application in vehicles with substantially any type of interaxle differential, such as bevel gear differentials, the present application shall be described in connection with an interaxle differential in the form of the Mack Power Divider, available from Mack Trucks, Inc., Greensboro, N.C., USA. As seen in FIG. 3, such an interaxle differential comprises a driving member, i.e., the forward interaxle differential input shaft 27, having at an end thereof a ring or cage 57 that carries a plurality of radially extending plungers 59 in two rows (only one row seen in FIG. 3), which are free to slide in holes in the cage inwardly and outwardly a short distance. An outer cam 61 and an inner cam 63 are connected to or formed at ends of the first forward interaxle differential output shaft 29 and the second forward interaxle differential output shaft 31, respectively. The inner cam 63 is placed within the cage 57 and the outer cam 61 surrounds the cage and the inner cam so that the three elements are in concentric relation, with the plungers bearing on both inner and outer cams. The two rows of plungers 59 are indexed alternately, or staggered, as are two rows of cam lobes 63a and 63b on the inner cam 63. The lobes (not visible in FIG. 3) of the outer cam 61 are indexed uniformly across the width of the outer cam.

Relative motion between the cage 57 and either of the inner cam 59 or the outer cam 61 will cause the plungers 59 to reciprocate, the plungers being pushed into the holes in the cage as they ride over the crests of the lobes and are allowed to move outwardly from the holes as they slide into valleys between the lobes. As the inner cam 59 and outer cam 61 are opposed, however, motion of a plunger caused by one cam as it surmounts the crest of one lobe causes motion on its other end so that it forces the other cam to turn in the opposite relative direction. This action is exactly like a conventional differential except that it is accomplished by cams and plungers instead of by gears.

The second forward interaxle differential output shaft 31 is typically connected by a splined joint to the inner cam 63 and extends through the first forward interaxle differential output shaft 29. The outer cam 61 is typically formed at or attached at an end of the first forward interaxle differential output shaft 29. The first forward interaxle differential output shaft 29 typically comprises, at an end opposite the outer cam 61, a bevel gear 67 that forms part of the forward axle differential 53 (FIG. 1).

A forward clutch arrangement 69 can be provided and is movable between a first position in which the forward clutch arrangement rotationally locks the forward interaxle differential input shaft 27 to the first and second forward interaxle differential output shafts 29 and 31 and a second position in which the forward interaxle differential input shaft is not locked to the first and second forward interaxle differential output shafts. An example of a forward clutch arrangement 69 suitable for use with the present invention is the air lock out arrangement available with the Mack Power Divider from Mack Trucks, Inc., Greensboro, N.C., USA. In the illustrated forward interaxle differential 25, the air lock out arrangement, hereinafter referred to as the forward clutch arrangement 69 comprises an externally splined ring 71 disposed around a shaft portion 73 of the forward interaxle differential input shaft 27 extending from the cage 57. The ring 71 is axially movable along the shaft portion 73 but prevented from rotation by a spline. A piston arrangement 75 is provided for moving the ring 71 back and forth relative to the cage 57. The piston arrangement 75 will ordinarily be pneumatically operated, but may be hydraulically or electrically operated instead.

The outer cam 61 comprises internal splines 65 that mate with the external splines on the ring 71 to rotationally lock the forward interaxle differential input shaft 27 to the first forward interaxle differential output shaft 29 to which the outer cam is attached, usually by a splined joint. At the same time, the forward clutch arrangement 69 rotationally locks the forward interaxle differential input shaft 27 to the second forward interaxle differential output shaft 31 through the forward interaxle differential 25, i.e., because relative motion of the outer cam 61 and the cage 57 is not possible, relative motion of the inner cam 53 and the cage is also not possible. When the forward clutch arrangement 69 is in the first position, the forward clutch arrangement thus effectively rotationally locks the forward interaxle differential input shaft to the intermediate drive shaft 33 through the second forward interaxle differential output shaft 31 and the universal joint 35.

Figure 4:
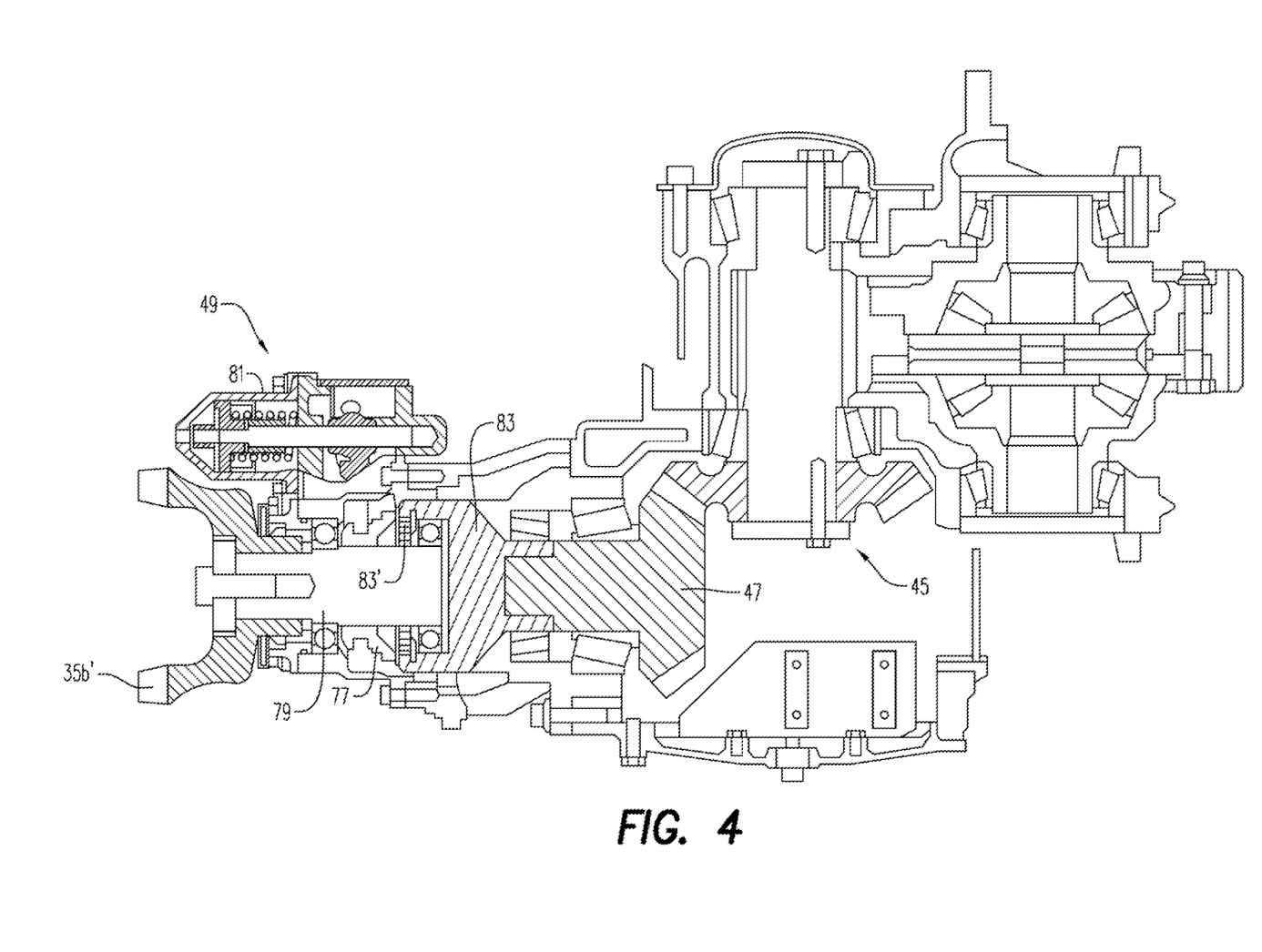
FIG. 4 is a partially cross-sectional side view showing a rear differential for a vehicle with a multiple drive axle assembly according to an aspect of the present invention.

The rear clutch arrangement 49 can be similar to the forward clutch arrangement 69, except that no cams are required, and structures corresponding to the inner cam and cage are omitted. An illustrative rear clutch arrangement is seen in FIG. 4. Ordinarily, both the rear clutch arrangement 49 and the forward clutch arrangement 69 will be non-synchronized clutches, however, they could be or include synchronized clutches. In the illustrated rear clutch arrangement 49, between the universal joint 35' and the rear differential 45, an externally splined ring 77 is non-rotatable but movable axially, by a piston arrangement 81 mounted on the first input shaft, relative to a first input shaft 79 connected to a yoke 35b' of the universal joint 41. An internally splined sleeve 83 is formed at or attached to an end of the rear differential input shaft 47. The externally splined ring 77 of the rear clutch arrangement 49 is movable between the first position (FIG. 2A) in which the externally splined ring engages with the internal splines 83' of the internally splined sleeve so that the rear clutch arrangement rotationally locks the intermediate drive shaft 33 and the rear differential input shaft 47 so that the intermediate drive shaft the rear differential input shaft rotate together, and a second position (FIG. 2B) in which the internal and external splines are disengaged and the intermediate drive shaft and the rear differential input shaft are rotationally disconnected. The piston arrangement 81 can be the same piston arrangement used in the air lock out arrangement available with the Mack Power Divider from Mack Trucks, Inc., Greensboro, N.C., USA, or any other suitable means for moving the ring 77 relative to the first input shaft 79 may be used.

FIG. 4 shows the input shaft 79 terminating by a forward end of the internally spline sleeve 83, however, it will be appreciated that a variety of alternative configurations can be provided. For example, the input shaft 79 can extend all the way through the center of the sleeve 83 and, if desired, the shaft 47, which can be advantageous in that it can reduce load on inner (usually needle roller) bearings.

Figure 5A:
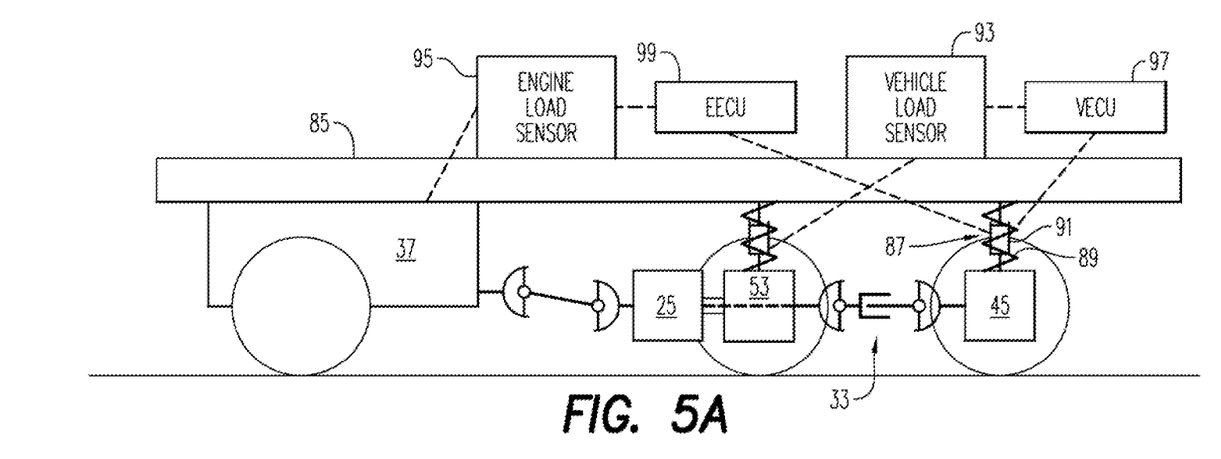
FIGS. 5A and 5B are schematic views showing a rear axle assembly of a vehicle according to an aspect of the present invention in a normal operating position and a raised position, respectively.
Figure 5B:
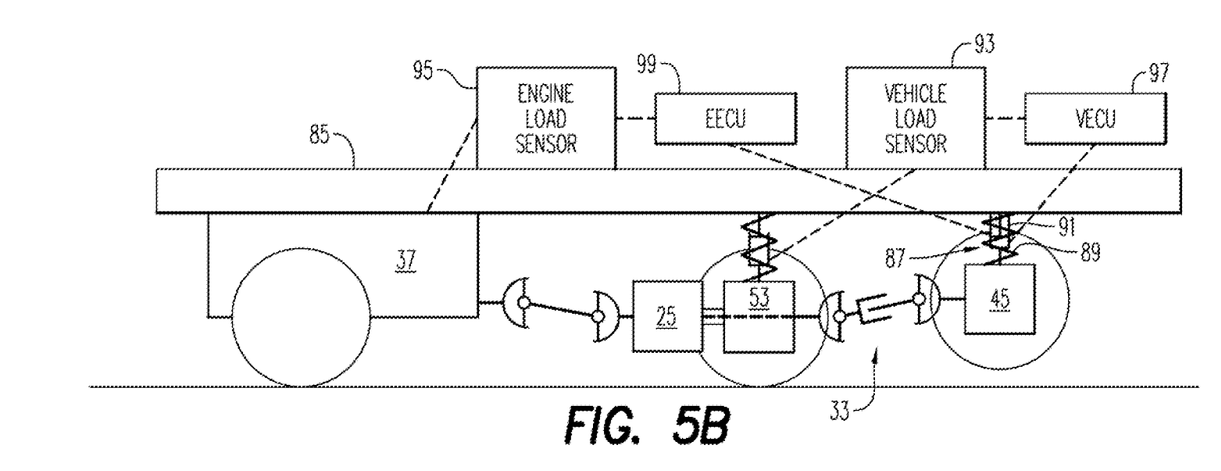

With reference to FIGS. 5A and 5B, the vehicle 21 can include any suitable means for raising the rear axle assembly 43 above a normal operating level (FIG. 5B) relative to a frame 85 of the vehicle and for lowering the rear axle assembly to the normal operating level (FIG. 5A) relative to the frame. For example, the raising and lowering, means nay be pan of a rear axle assembly suspension array 87 for supporting the rear axle assembly relative to a frame of the vehicle. The rear axle assembly suspension arrangement 87 can include a spring component 89 and a pneumatically or hydraulically adjustable pressurizable component 91. By increasing and decreasing pressure in the pressurizable component 91, the spring component 89 can be extended or contracted for vice versa, depending upon the configuration of the suspension arrangement) to lower or raise the rear axle assembly 43 relative to the frame 85. Alternatively, the means for raising and lowering may be independent of the suspension system, such as separate hydraulic or pneumatic pistons attached to the frame that can compress the normal suspension system to raise the rear axle assembly and permit the suspension system to expand to its normal position to lower the rear axle assembly. It is presently believed that substantially any hydraulic, pneumatic or electrically actuated mechanical connection between the vehicle frame and suspension mountings brackets that will permit the suspension bracket(s) height and the frame height to change independent of each other would be suitable.

Because the load on the vehicle 21 will ordinarily not increase while the vehicle is in motion, it is presently believed to be preferable to ordinarily only lower the rear axle assembly 43 relative to the frame 85 when the vehicle is stopped or moving at low speeds, such as no greater than around 25 miles/hr (40 km/hr) to minimize the risk of damage to stationary tires when they contact the ground at higher vehicle speeds. Therefore, to lower the rear axle assembly 43, the typical sequence is to, first, cause the raising and lowering means to lower the rear axle assembly to a normal operating level and, second, cause the rear clutch arrangement 49 to move from the second position to the first position. Thus, if the vehicle 21 is in motion and the first input shaft 79 is being driven, by lowering the rear axle assembly 43 to the normal operating level, contact between the ground and the wheels on left and right rear drive axles will turn the components of the rear differential 45 such that the rear differential input shaft 47 and the internally splined sleeve 83 on the roar differential input shaft should be turning at the same speed as the first input shaft and the externally splined ring 77 on the first input shaft and the first clutch can move to the first position (engaged externally splined ring and internally splined sleeve) smoothly.

The foregoing sequence can be performed by an operator or by an appropriately programmed control unit. For example, the sequence can be performed when, for example, a vehicle load sensor 93 and/or an engine load sensor 95 senses that a load carried on the vehicle 21 or by the engine 37 is sufficient such that the mar drive axle 43 should be lowered to the normal operating position and transmits this information to a control unit, e.g., a Vehicle Electronic Control Unit (VECU) 97 or an Engine Electronic Control Unit (EECU) 99. The VECU and the EECU may be the same unit or separate units. The VECU 97 and/or the EECU 99 can then provide appropriate signals to the means for raising and lowering to lower the rear axle assembly 43 and to the rear clutch arrangement 49 to move to the first position.

Instead of first lowering the rear axle assembly 43 and then moving the rear clutch arrangement 49 to the first position, it is also possible to reverse the sequence and first move the rear clutch to the first position so that the intermediate drive shaft 33 is rotationally locked to the rear differential input shaft 47 and then lower the rear axle assembly 43 so that the wheels on the rear axle are moving at the same speed as the vehicle 21 when they contact the ground, which would minimize the risk of damage to the wheels. In this situation, while a non-synchronized clutch might be used, it is believed to be preferable to provide a synchronized rear clutch so that non-rotating components of the rear axle assembly 43 can be gradually brought up to speed with the rotating intermediate drive shaft and other already moving components of the multiple drive axle assembly.

A presently preferred sequence of steps for raising the rear axle assembly 43 relative to the frame 85 of the vehicle may be performed by an operator or under control of control units such as the VECU 97 and/or the EECU 99 in response to load signals from one or both of the vehicle load sensor 93 and the engine load sensor 95 indicating that a load carried on the vehicle 21 or by the engine 37 is sufficiently light such that the rear drive axle 43 should be raised above the normal operating position. In this sequence of steps, the forward clutch arrangement 69 is first moved to the first position (FIG. 2B) in which the forward clutch arrangement rotationally locks the forward interaxle differential input shaft 27 relative to the first and second forward interaxle differential output shafts 29 and 31 so that, when the rear axle assembly 43 is raised, the forward interaxle differential will continue to transmit power to the forward differential 53 of the forward axle assembly 23. After the forward clutch arrangement 69 has been caused to move to the first position, the raising and lowering means raises the rear axle assembly 43 above the normal operating level. Ordinarily, after the rear axle assembly 43 has been raised above the normal operating level, the rear clutch arrangement 49 is caused to move to the second position so that the intermediate drive shaft 33 and the rear differential input shaft 47 are rotationally disconnected. It is, however, also possible to first rotationally disconnect the intermediate drive shaft 33 and the rear differential input shaft 47 and then raise the rear axle assembly 47.

By permitting raising of the rear axle assembly 43 above the normal operating level relative to the frame 85 of the vehicle 21 and lowering of the rear axle assembly back to the normal operating level, it is possible to better ensure that appropriate transmission input power levels are provided to operating axle driveheads during lighter and heavier loads. Additionally, by disengaging the rear differential 45 at the rear differential input shaft 47, it is possible to reduce churning losses due to driving of rear differential components when the rear axle assembly 43 is raised, which is expected to permit fuel economy improvements of about 0.5-1%. Further, by disengaging the rear differential 45 at the rear differential input shaft 47, it is possible to minimize false Brinell damage and fretting to the bearings of the rear universal joint 41 that tends to occur due to interaxle prop shaft vibration and light load if the prop shaft is not spinning.

In a method of operating the vehicle 21 having a multiple drive axle assembly, under ordinary driving conditions in which power is transmitted to each drive axle assembly, power from the forward interaxle differential input shaft 27 is divided between the first forward interaxle differential output shaft 29 associated with the forward axle assembly 23 and a second forward interaxle differential output shaft 31 associated with the rear axle assembly 43 via a forward interaxle differential 25. Power is transmitted to the rear differential input shaft 47 of the rear differential 45 of the rear axle assembly 43 via the intermediate drive shaft 33 connected to the second forward interaxle differential output shaft 31. Operation under such ordinary operating conditions is ordinarily performed when signals from sensors such as one or both of the vehicle load sensor 93 and the engine load sensor 95 indicating that a load carried on the vehicle 21 or by the engine 37 that are read by an operator or received by control units such as the VECU 97 and/or the EECU 99 is sufficiently high such that operation under normal operating conditions is appropriate.

According to the method, if it is sensed that, for example, engine load or vehicle load is lower than loads for which the engine or vehicle is designed to operate, such as following unloading of a previously loaded vehicle, a sequence of steps can be performed to rotationally disconnecting the intermediate drive shaft 33 and the rear differential input shaft 47 and raise the rear axle assembly 43 above the normal operating level relative to the frame 85 of the vehicle 21. Signals may be obtained from sensors such as one or both of the vehicle load sensor 93 and the engine load sensor 95 indicating that a load carried on the vehicle 21 or by the engine 37 and that are read by an operator or received by control units such as the VECU 97 and/or the EECU 99 may reflect that the load(s) is (are) lower than the load(s) for which the engine or vehicle is designed to operate. The sequence of steps may be performed while the vehicle 21 is stationary or moving, such as while the vehicle pulls away from a loading dock.

In the presently preferred sequence of steps for raising the rear axle assembly 4 relative to the frame 85, first, before rotationally disconnecting the intermediate drive shaft 33 and the rear differential input shaft 47, the forward interaxle differential input shaft 27 is locked to the intermediate drive shaft 33 through the forward interaxle differential 25, such as by locking the forward interaxle differential input shaft relative to the first and second forward interaxle differential output shafts 29 and 31 by moving the forward clutch arrangement 69 to the first position. After the forward clutch arrangement 69 has been caused to move to the first position, the raising and lowering means raises the rear axle assembly 43 above the normal operating level. Ordinarily, after the rear axle assembly 43 has been raised above the normal operating level, the rear clutch arrangement 49 is caused to move to the second position so that the intermediate drive shaft 33 and the rear differential input shaft 47 are rotationally disconnected. It is also possible to first rotationally disconnect the intermediate drive shaft 33 and the rear differential input shaft 47 and then raise the rear axle assembly 47.

In the presently preferred sequence of steps for lowering the rear axle assembly 43 relative to the frame 85, it is preferred that the vehicle first be stopped or moving at low speed. With the vehicle 21 stopped or moving at low speed, the rear axle assembly 43 is then lowered to a normal operating level relative to the frame 85 of the vehicle. After lowering the rear axle assembly 43 relative to the frame, then the intermediate drive shaft 33 and the rear differential input shaft 47 are rotationally connected, such as by moving the rear clutch 49 to the first position.

The illustrated vehicle 21 is a so-called 6×4 configuration, i.e., six wheels, four of which are driven wheels, however, the present invention is also applicable to other configurations, such as 6×6, 8×6, 8×8, 10×8, and 10×10 configurations. In vehicles with such configurations, it is possible to permit raising of the rear-most drive axle alone, or together with successive additional drive axles except for the forward-most drive axle. Ordinarily, each of the intermediate drive axles between the forward-most and the rear-most drive axles will include an interaxle differential similar to the forward interaxle differential 25, and the rear-most axle will include a differential, like the rear differential 45. A single rear clutch might be provided to disengage all of the drive axles except for the forward-most drive axle, or clutches similar to the forward clutch 69 can be provided to individually engage or disengage the intermediate drive axles successively from rear toward front. For example, if the rear drive axle and the intermediate drive axles are individually engageable or disengageable, they will ordinarily be raised and disengaged individually from rear toward front, with the rear-most drive axle being raised and disengaged first, the second rear-most intermediate drive axle being raised and disengaged second, etc.

In the present application, the use of terms such as "including" is open-ended and is intended to have the same meaning as terms such as "comprising" and not preclude the presence of other structure, material, or acts. Similarly though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A vehicle having a multiple drive axle assembly, comprising:
    a forward axle assembly comprising, a forward interaxle differential, a forward interaxle differential input shaft, a first forward interaxle differential output shaft, and a second forward interaxle differential output shaft, the forward interaxle differential distributing power from the forward interaxle differential input shaft between the first and the second forward interaxle differential output shafts;
    an intermediate drive shaft directly connected to the second forward interaxle differential output shaft;
    a rear axle assembly comprising a rear differential and a rear differential input shaft;
    a rear clutch arrangement between the intermediate drive shaft and the rear differential input shaft, the rear clutch arrangement being movable between a first position in which the rear clutch arrangement rotationally locks the intermediate drive shaft and the rear differential input shaft and a second position in which the intermediate drive shaft and the rear differential input shaft are rotationally disconnected.

2. The vehicle as set forth in claim 1, comprising a forward clutch arrangement movable between a first position in which the torward clutch arrangement rotationally locks the forward interaxle differential input shaft to the first and second forward interaxle differential output shafts and a second position in which the forward interaxle differential input shaft is not locked to the first and second forward interaxle differential output shafts.

3. The vehicle as set forth in claim 2, wherein the forward clutch arrangement rotationally locks the forward interaxle differential input shaft directly to the first forward interaxle differential output shaft.

4. The vehicle as set forth in claim 3, wherein the forward clutch arrangement rotationally locks the forward interaxle differential input shaft to the second forward interaxle differential output shaft through the forward interaxle differential.

5. The vehicle as set forth in claim 2, comprising a controller programmed to cause the rear clutch arrangement to move from the first position to the second position only after the forward clutch arrangement is moved to the first position.

6. The vehicle as set forth in claim 2, wherein the forward clutch arrangement is a non-synchronized clutch.

7. The vehicle as set forth in claim 1, comprising means for raising the rear axle assembly above a normal operating level relative to a frame of the vehicle and for lowering the rear axle assembly to the normal operating level relative to the frame.

8. The vehicle as set forth in claim 7, comprising a controller programmed to first, cause the raising and lowering means to lower the rear axle assembly to a normal operating level and, second, cause the rear clutch arrangement to move from the second position to the first position.

9. The vehicle as set forth in claim 7, comprising a forward clutch arrangement movable between a first position in which the forward clutch arrangement rotationally locks the forward interaxle differential input shaft relative to the first and second forward interaxle differential output shafts and a second position in which the forward interaxle differential input shaft is not locked to the first and second forward interaxle differential output shafts, and a controller programmed to first, cause the forward clutch arrangement to move to the first position and, second, cause the raising and lowering means to raise the rear axle assembly above the normal operating level.

10. The vehicle as set forth in claim 9, wherein the controller is programmed to cause the rear clutch arrangement to move to the second position after the rear axle assembly has been raised above the normal operating level.

11. The vehicle as set forth in claim 7, wherein the raising and lowering means are part of a rear axle assembly suspension arrangement for supporting the rear axle assembly relative to the frame of the vehicle.

12. The vehicle as set forth in claim 1, wherein the intermediate drive shaft is adjustable in length.

13. The vehicle as set forth in claim 1, comprising a forward clutch arrangement movable between a first position in which the forward clutch arrangement rotationally locks the forward interaxle differential input shaft to the intermediate drive shaft and a second position in which the forward interaxle differential input shaft is not locked to the intermediate drive shaft.

14. The vehicle as set forth in claim 13, wherein the second forward interaxle differential output shaft is rotationally connected to the intermediate drive shaft by a yoke, and the forward clutch arrangement rotationally locks the forward interaxle differential input shaft to the intermediate drive shaft by rotationally locking the forward interaxle differential input shaft to the first and second forward interaxle differential output shafts.

15. The vehicle as set forth in claim 1, wherein the first and second forward interaxle differential output shafts are coaxial.

16. The vehicle as set forth in claim 1, wherein the vehicle further comprises a non-driven axle.

17. The vehicle as set forth in claim 1, wherein the rear clutch arrangement is a movable, splined ring-type clutch.

18. A vehicle having a multiple drive axle assembly, comprising:
a forward axle assembly comprising a forward interaxle differential a forward interaxle differential input shaft and a forward interaxle differential output shaft;
an intermediate drive shaft connected to the forward interaxle differential output shaft;
a rear axle assembly comprising a rear differential and a rear differential input shaft;
a rear clutch arrangement between the intermediate drive shaft and the rear differential input shaft, the rear clutch arrangement being a movable, splined ring-type clutch and being movable between a first, position in which the rear clutch arrangement rotationally locks the intermediate drive shaft and the rear differential input shaft and a second position in which the intermediate drive shaft and the rear differential input shaft are rotationally disconnected, and
a forward clutch arrangement movable between a first position in which the forward clutch arrangement rotationally locks the forward interaxle differential input shaft to the forward interaxle differential output shaft and a second position in which the forward interaxle differential input shaft is not locked to the forward interaxle differential output shaft.

19. The vehicle as set forth in claim 18, wherein the forward clutch arrangement rotationally locks the forward interaxle differential input shaft to the intermediate drive shaft when in the first position and the forward interaxle differential input shaft is not locked to the intermediate drive shaft when the forward clutch arrangement is in the second position.

20. A method of operating a vehicle having a multiple drive axle assembly, comprising
dividing power from a forward interaxle differential input shaft between a first forward interaxle differential output shaft associated with a forward axle assembly and a second forward interaxle differential out shaft associated with a rear axle assembly via a forward interaxle differential;
transmitting power to a rear differential shaft of a rear differential of the rear axle assembly via an intermediate drive shaft connected to the second forward interaxle differential output shaft;
rotationally disconnecting the intermediate drive shaft and the rear differential input shaft by moving a rear clutch arrangement between the intermediate drive shaft and the rear differential input shaft, the rear clutch arrangement being a movable, splined ring-type clutch, from a first position in which the rear clutch arrangement rotationally locks the intermediate drive shaft and the rear differential input shaft to a second position in which the intermediate drive shaft and the rear differential input shaft are rotationally disconnected, and
raising the rear axle assembly above a normal operating level relative to a frame of the vehicle.

21. The method as set forth in claim 20, comprising, before rotationally disconnecting the intermediate drive shaft and the rear differential input shaft, locking the forward interaxle differential input shaft to the intermediate drive shaft through the forward interaxle differential.

22. The method as set forth in claim 20, comprising, while driving the vehicle via the forward axle assembly with the rear axle assembly raised relative to the frame of the vehicle, first, lowering the rear axle assembly to a normal operating level relative to the frame of the vehicle and, second, rotationally connecting the intermediate drive shaft and the rear differential input shaft.

* * * * *